US007287251B1

(12) United States Patent
Mensching et al.

(10) Patent No.: US 7,287,251 B1
(45) Date of Patent: Oct. 23, 2007

(54) SOURCE ENGINE FOR TRANSFERRING A RESOURCE TO LOCAL SECURE CACHE

(75) Inventors: Rob Mensching, Redmond, WA (US); Terri Cheff, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 705 days.

(21) Appl. No.: 10/687,730

(22) Filed: Oct. 16, 2003

(51) Int. Cl.
*G06F 9/445* (2006.01)
*G06F 9/44* (2006.01)

(52) U.S. Cl. .................. 717/174; 717/168; 717/175

(58) Field of Classification Search ........ 717/168–178; 709/220–223
See application file for complete search history.

(56) References Cited

U.S. PATENT DOCUMENTS

| | | | |
|---|---|---|---|
| 6,256,773 B1* | 7/2001 | Bowman-Amuah | 717/121 |
| 6,418,554 B1* | 7/2002 | Delo et al. | 717/174 |
| 6,438,750 B1* | 8/2002 | Anderson | 717/178 |
| 6,449,682 B1* | 9/2002 | Toorians | 711/100 |
| 6,453,469 B1* | 9/2002 | Jystad | 717/174 |
| 6,457,122 B1* | 9/2002 | Ramezani | 713/1 |
| 6,523,166 B1* | 2/2003 | Mishra et al. | 717/174 |
| 6,578,142 B1* | 6/2003 | Anderson et al. | 713/2 |
| 6,691,106 B1* | 2/2004 | Sathyanarayan | 707/3 |
| 6,732,358 B1* | 5/2004 | Siefert | 717/173 |
| 6,779,177 B1* | 8/2004 | Bahrs et al. | 717/173 |
| 7,117,495 B2* | 10/2006 | Blaser et al. | 717/174 |
| 7,162,628 B2* | 1/2007 | Gentil et al. | 713/100 |
| 7,219,266 B2* | 5/2007 | Glerum et al. | 714/38 |

OTHER PUBLICATIONS

GroB et al, "Proving a WS feferation passive requestor profile with a browser model", ACM SWS, pp. 54-64, 2005.*
Wasfi, "Collecting user access patterns for building user profiles and collabortaive filtering", ACM IUI, pp. 57-64, 1999.*
Mcfarling, "Reality based optimization", IEEE, pp. 59-68, 2003.*
Zhang et al, "System support for automatic profiling and optimization", ACM SOSP, pp. 15-26, 1997.*
Coherent Distributed File Cache with Directory Write-Behind, by Timothy Mann; Andrew Brill; Andy Hisgen; Charles Jerian; Garret Swart; ACM Transactions on Computer Systems, v. 12, n. 3, May 1994; p. 123-164.

(Continued)

*Primary Examiner*—Anil Khatri
(74) *Attorney, Agent, or Firm*—Merchant & Gould P.C.

(57) ABSTRACT

A source engine system in a computing system retrieves a program code resource from one of a plurality of sources of program code. The program code resource is retrieved and placed in secure cache in the computing system. A user profile is impersonated by the computing system so that the computing system follows the user profile during retrieval of the resource. A source for the resource is picked, and the resource is opened. Whether the user has access to the resource is tested based on the user profile. If the user has access, the resource is read to the secure cache. The resource is written into the secure cache and verified that it is same as the resource in the source. If the user does not have access, a new source for the resource is picked, and the resource in the new source opened and read to the secure cache if the user has access to the resource in the new source.

16 Claims, 7 Drawing Sheets

OTHER PUBLICATIONS

"IO-Lite: A Unified I/O Buffering and Caching System," by V.S. Pai; P. Drruschel; W. Zwaenekpoal; ACM Transactions on Computer Systems, vol. 18, No. 1; p. 37-66, 2000.

"DAN: Distributed Code Caching for Active Networks," by D. Decasper; B. Plattner; Proaceedings IEEE INFOCOM '98, the Conference on Computer Communications. Seventeenth Annual Joint Conference of the IEEE Computer and Communications Societies. Gateway to the 21$^{st}$ Century (Cat. No. 98CH36169), Part vol. 2, p. 609-16, 1998.

"Integrating the Spiralog File System Into the Open VMS Operating System," by Mark A. Howell; Julian M. Palmer; Digital Technical Journal, v. 8, n. 1, 1996; p. 46-56.

"Database System Design for High Performance," by R. Bayer; Proceedings of the IFIP 9$^{th}$ World Computer Congress, p. 147-55, 1983.

* cited by examiner

SOURCE ENGINE FOR TRANSFERRING A RESOURCE TO LOCAL SECURE CACHE

TECHNICAL FIELD

The invention relates generally to the field of installing and updating computer program code in a computing system. More particularly, the invention relates to a system service running in a local system for saving program code installation files, using the files for updates and repairs, and controlling the downloading of setup, updates, and error reports.

BACKGROUND OF THE INVENTION

The installation of program code in a computing system requires an original program code to be loaded into the computing system from a CD or DVD, downloaded onto the computing system over the internet to the computing system, or downloaded onto the computing system from a shared source in a corporate network. Subsequent updates may again require access to the original program to install the update. Unfortunately, the original program code is not always available as the user may not have kept the original CD or not kept the download authorization for the original program code.

It is with respect to these considerations and others that the present invention has been made.

SUMMARY OF THE INVENTION

In embodiments of the present invention, a method is provided for retrieving a program code resource from a source of program code and placing the resource in a secure cache in the computer system. A user profile is impersonated by the computing system so that the computing system follows the user profile during retrieval of the resource. A source for the resource is picked, and the resource is opened. Whether the user has access to the resource is tested based on the user profile. If the user has access, the resource is read to the secure cache. The resource is written into the secure cache and verified that it is the same as the resource in the source. If the user does not have access, a new source for the resource is picked, and the resource in the new source is opened and read to the secure cache if the user has access to the resource in the new source.

In accordance with other aspects, embodiments of the present invention relate to a source engine system in a computing system for retrieving a program code resource from one of a plurality of sources of program code. An open resource module in the source engine opens a program code resource in a source if the user has access. A pick source module picks a second source for the resource program code if the user does not have access. A read module transfers the program code resource to a writer module for a secure cache in the computing system. The writer module writes the program code resource into the secure cache. A verify module verifies the program code resource in the secure cache matches the program code resource in the source, and a delete module deletes the program code resource from the secure cache if the program code resource in the secure cache does not match the program code resource in the source. The source engine system profile impersonates the user profile during retrieval of the program code resource and returns to the system profile after the program code resource is written to the secure cache.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
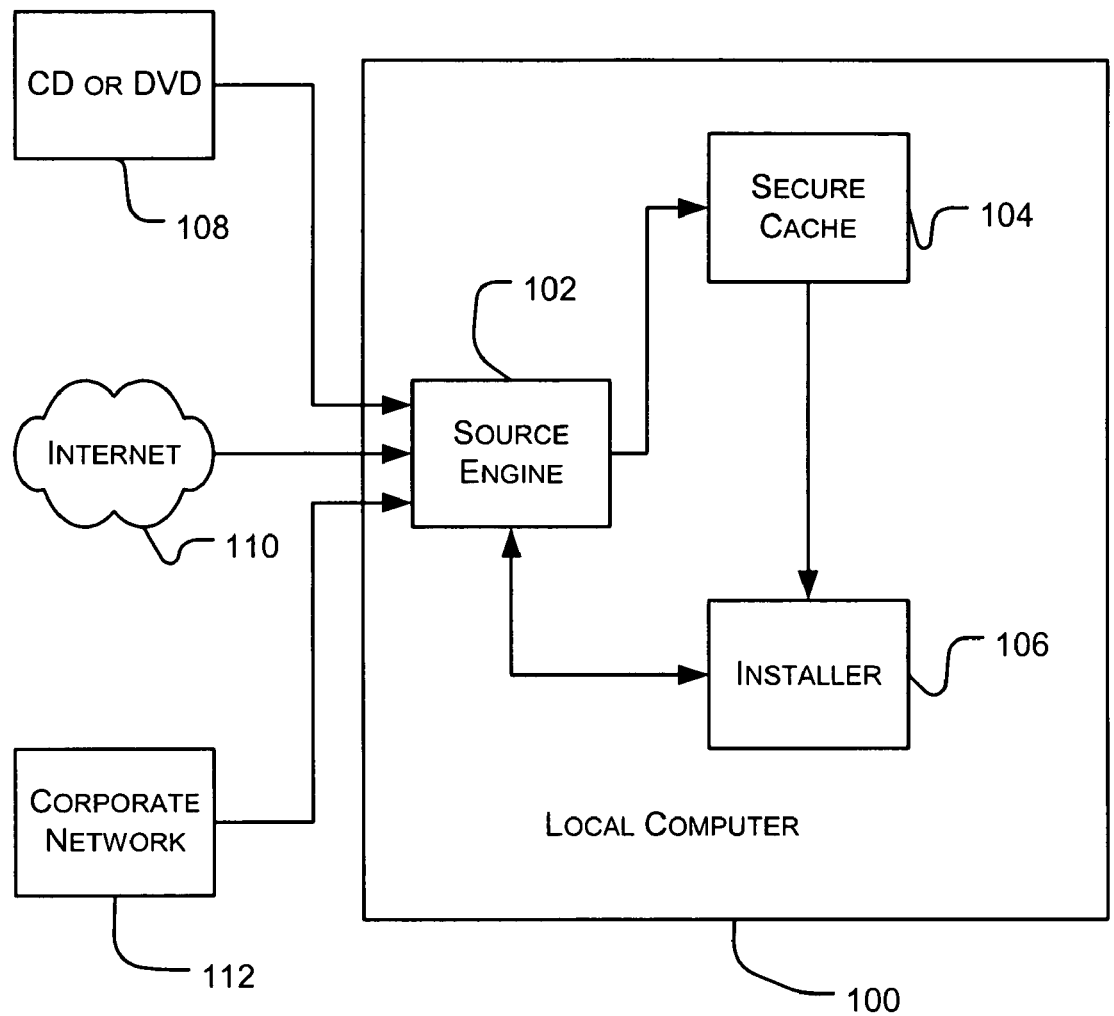
FIG. 1 illustrates one embodiment of the invention where the source engine in a local computing system retrieves a resource and places it in a secure cache for use by an installer module.

FIG. 1 illustrates one embodiment of the invention having a source engine in a local computer. The local computer 100 includes, in embodiments, the source engine software 102, a secure cache system 104 and an installer 106. The source engine 102 has control over acquiring software resources and loading them into a secure cache 104. The software resources may be retrieved by the source engine from a CD or a DVD drive 108 and written into the secure cache 104. Alternatively, the source engine 102 may retrieve the program code resource as a download over the Internet 110 from a web site supplying the program code resource. Yet a third possible source of program code would be a corporate network where the corporation has a license to provide the program code to local computers on the network. In one example, the source engine retrieves the resource program code from the corporate network 112, and loads it into the secure cache 104.

When the program code is to be installed in the local computer's system then the installer module 106 asks the source engine 102 the location of the program code and the secure cache 104. The installer then reads the program code from the secure cache 104. The installer module may be a setup program, a repair program for installing patches, an update routine to install updates, or an alert system for installing repairs and updates.

In embodiments, the installer module 106 does not have access to the secure cache 104 except to read the program code placed there by the source engine 102. The source engine 102 and the secure cache 104 may work together to provide a secure system for the original program code. The secure system can prevent inadvertent or deliberate alteration of the original program code retrieved by the source engine 102 and loaded into the secure cache 104. Embodiments of the operations performed by the source engine 102 to cache a resource in the secure cache 104 are shown in FIGS. 3-7.

Figure 2:
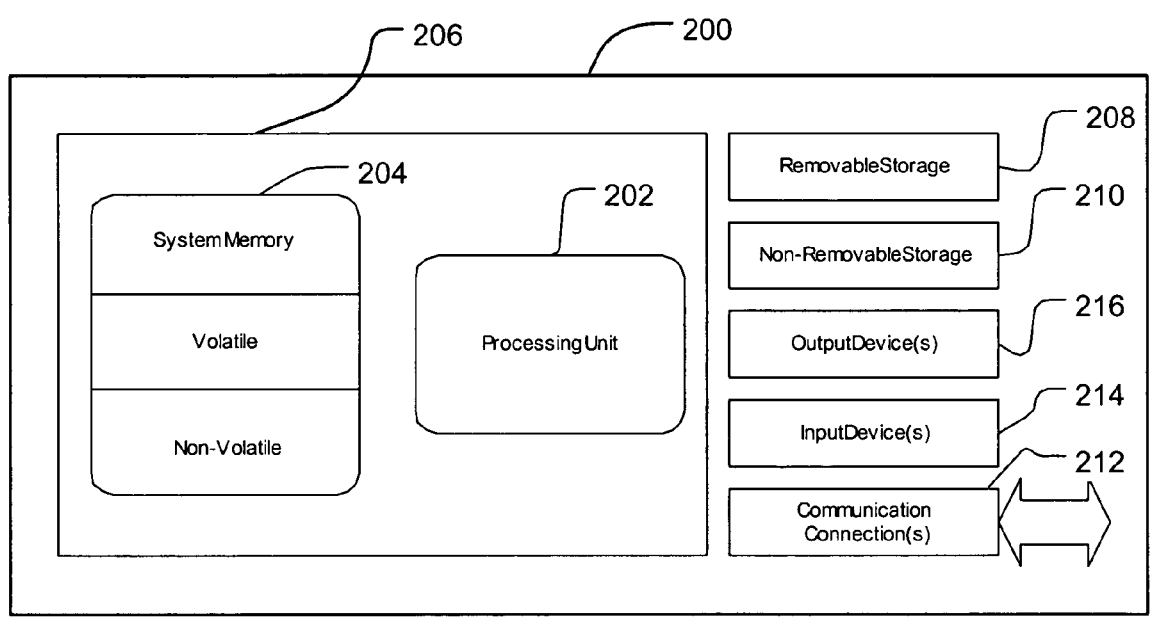
FIG. 2 illustrates an example of a suitable computing system environment on which embodiments of the invention may be implemented.

FIG. 2 illustrates an example of a suitable computing system environment on which embodiments of the invention may be implemented. In its most basic configuration, system includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system may include at least one other form of computer readable media. Computer readable media can be any available media that can be accessed by the system 200. By way of example, and not limitation, computer readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, displays, speakers, and printers. Each of these "peripheral devices" are well know in the art and, therefore, not described in detail herein.

In the embodiments describing the source engine, which follow in reference to FIGS. 3-7, the logical operations of the various embodiments may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts, or modules. It will be recognized by one skilled in the art that these operations, structural devices, acts and modules may be implemented in software, in firmware, in special purpose digital logic, or any combination thereof without deviating from the spirit and scope of the present invention as recited within the claims attached hereto.

Figure 3:
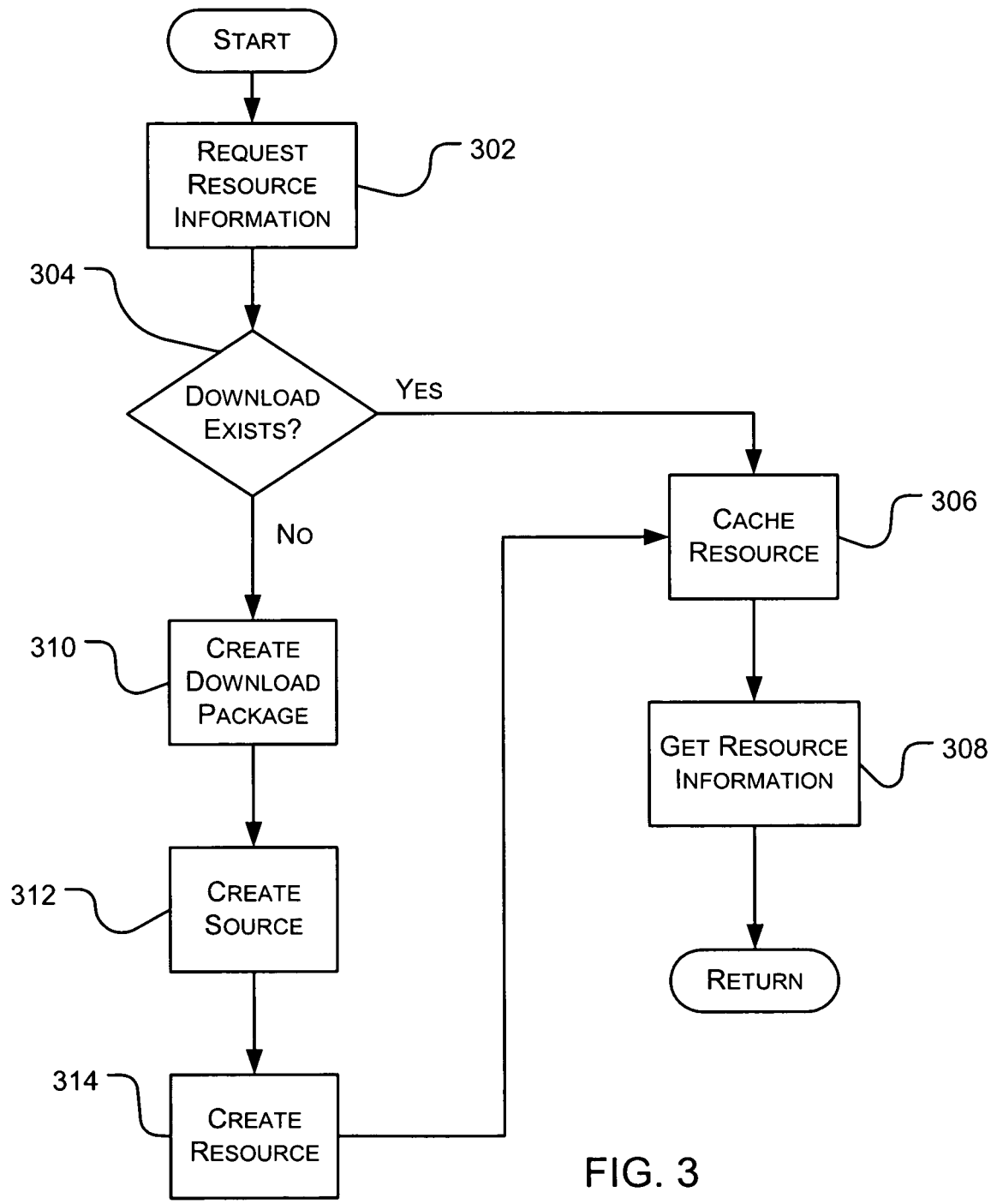
FIG. 3 illustrates the main operational flow of the source engine for retrieving resource information.

In FIG. 3, the operational flow for retrieving resource information is illustrated. The flow begins when request operation 302 receives a request from the calling program for resource information. In one embodiment, request operation requests the information from the source engine 102 (FIG. 1). The source engine 102 (FIG. 1), in a download test operation 304, detects whether the download exists. If the download containing the resource information exists, then the operation flow branches YES to the cache resource operation 306.

Cache resource operation 306 can detect that the resource is cached, can verify that the resource and can make the resource available. When the resource is available, the get operation 308 provides the resource to the calling program and the operation flow returns operation the source engine 102 (FIG. 1).

If the download does not exist, then the resource must be created in accordance with parameters from the calling program. In this example, the operation flow branches NO from the download test operation 304 to the create download package operation 310. Create download package operation 310 receives the parameters of the download package from the calling program and builds the download package. With the download package defined and given and ID, the operation flow proceeds to create source operation 312. Create source operation 312 receives parameter information defining the sources from the calling program and creates the sources IDs from which the resource information can be found. As discussed above, there will typically be multiple sources for the same resource information. After create source operation 312, create resource operation 314 receives a list of resources defined by the calling program and generates resource IDs for the resource information so that the resources may be retrieved from a source. The completion of operations 310, 312, and 314 completely define the download, which is given an ID, and which is then provided to the cache resource operation 306.

Figure 4:
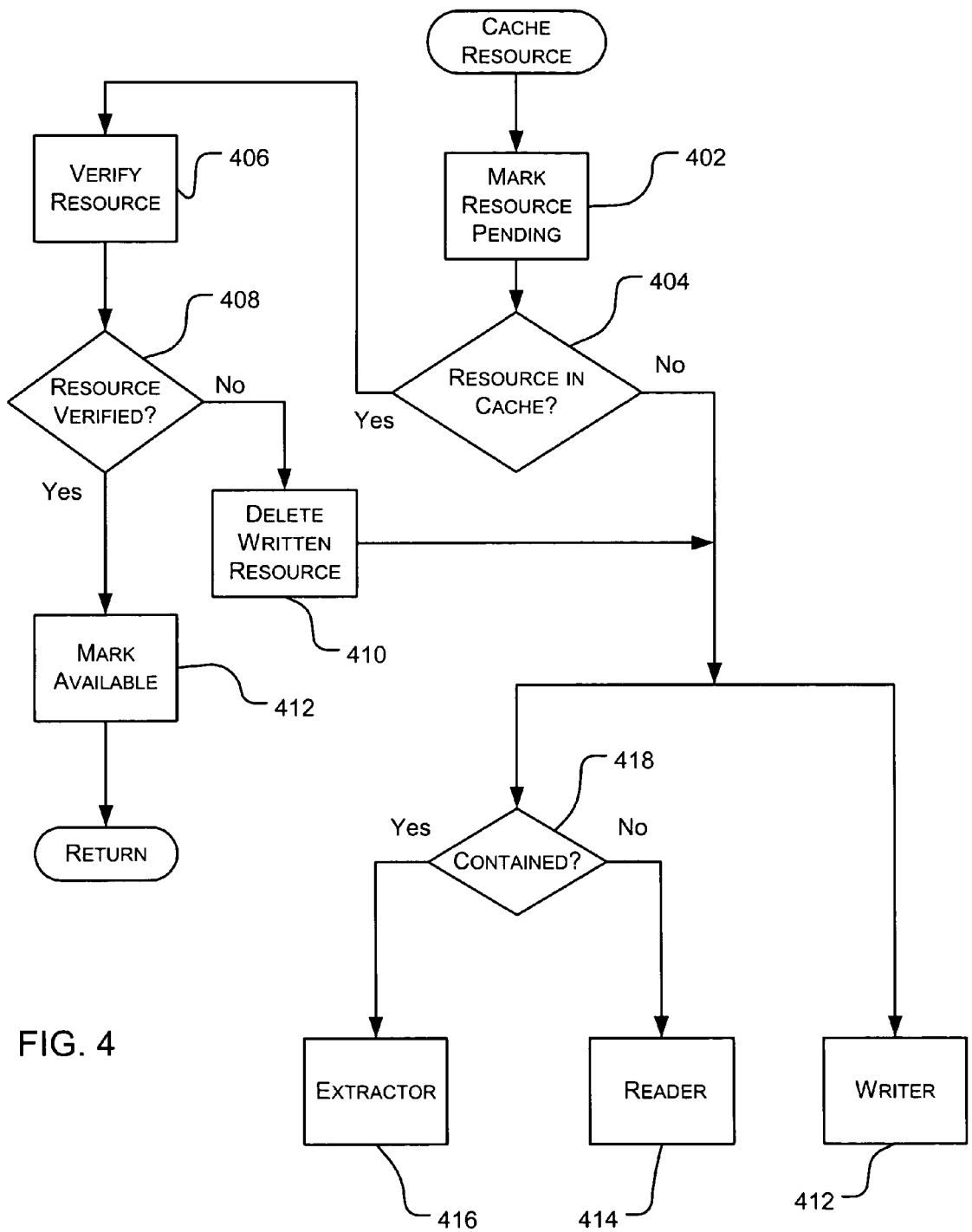
FIG. 4 shows the operational flow of operations performed by the cache resource module 306 in FIG. 3.

The operational flow of the cache resource module 306 (FIG. 3) is illustrated in FIG. 4. The operation flow begins at mark operation 402, which marks the retrieval of the resource information as pending. Cache test operation 404 tests whether the resource is in a cache or must be placed in a cache. If the resource is in the cache, then operation flow branches YES to verify resource operation 406. Resource information is verified based on a check phrase written with the resource information in the cache. The check phrase, in embodiments, is a hash number computed from the original resource information using a hash algorithm. A hash number for the resource information in the cache is calculated according to the same hash algorithm. If the calculation produces a hash number matching the check phrase, then the resource in the cache is verified.

Resource verify test 408 detects whether the verification operation 406 was successful. If the resource was verified, then the operation flow branches YES to mark operation 412 to mark the resource available from the cache. The program flow then returns to get the resource information operation 308 in FIG. 3. If the resource information cache was not verified, then the operation flow branches NO to delete operation 410. Delete operation 410 erases the written resource information in the cache, and the operation flow proceeds to operations to rewrite or to load the resource information in the cache. Operations loading the resource information in the cache are described hereinafter.

Returning to the in cache test operation 404, if the resource information is detected as not in the cache, then the operation flow branches NO to the load cache operations. The load cache operations amount to two parallel operations: (1) reading resource information from a source and (2) writing the resource information into a cache. The writing operation is performed by writer module 412, which is described hereinafter with reference to FIG. 6. The retrieving of the resource information from a source can be accomplished in either of two ways depending on whether the resource is stored at a first level in a source or whether it is stored at a second level within a source. In embodiments, a second level is the resource inside a container stored in the source. The container is often referred to as a cabinet file and the resource as a file inside the cabinet file. If the resource is in a resource file in a source, then the resource is retrieved by a reader module 414, which is described hereinafter with reference to FIG. 5. If the resource file is in a cabinet file or a folder in the source, then the resource is retrieved by an extractor module 416. The extractor module 416 is described hereinafter with reference to FIG. 7. Whether the resource file is in a source or in a cabinet file in a source is detected by contained test operation 418. Contain test operation 418 branches the operation flow to the extractor module 416 is the resource file is contained within a cabinet file in the source. If the resource file is not contained in another file, then the operation flow branches NO from contain test operation 418 to the reader module 414.

Figure 5:
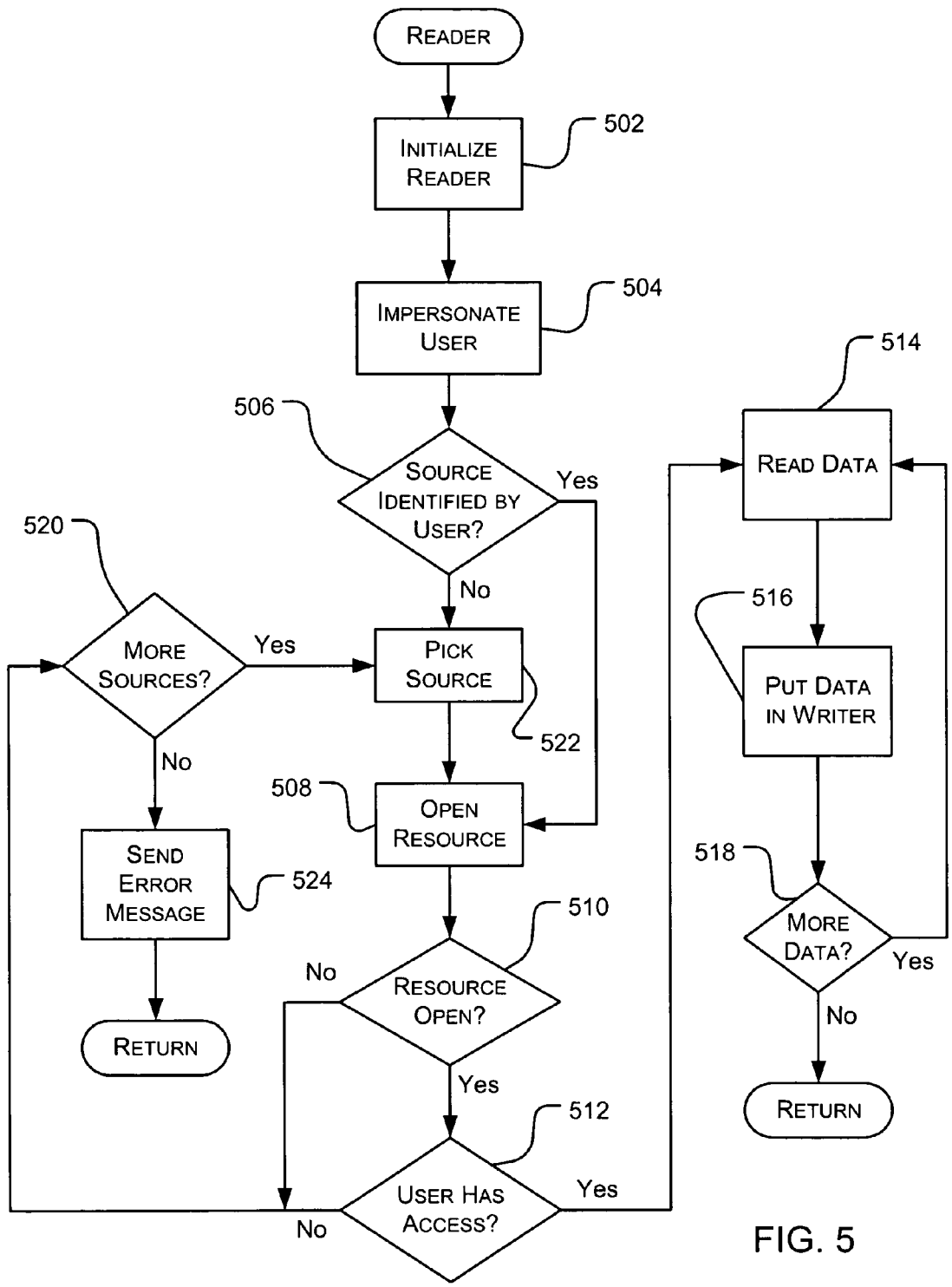
FIG. 5 illustrates the operational flow of operations performed by the reader module 414 in FIG. 4.

In FIG. 5 the operational flow of the reader module begins with an initialize operation 502. The initialize operation 502 loads all the necessary parameters for the reader to retrieve the resource from a source. After initialization, impersonate operation 504 installs all of the personal parameters for the user into the retrieval process. In other words, the retrieval process is operating based on the profile of the user rather than the profile of the computing system that the user is using. The impersonation is important as it provides additional security, i.e., only a user with the user's profile may perform the cache loading and the retrieval of the resource from the cache.

After the reader is initialized, and the user's profile is loaded, then a source identity test 506 detects whether the user has specified a source from which to retrieve the resource. If the user specified a source for the resource, then the operation flow branches YES from the source identify test 506 to open resource operation 508. The open resource operation 508 gets the resource file from the source and opens the resource file, if found and if the user has access. Resource open test operation 510 is checking to see that the resource was found and could be opened. Access test operation 512 checks whether the user has access to the resource, i.e., is identified as a user that can have the resource. If the resource open test and the access test are passed successfully, then the operation flow branches YES from access test operation 512 to a read date operation 514. Read data operation 514 begins the process of transferring the data to the writer. As each block of data is read, put data operation 516 transfers the data into the writer, and more data test operation 518 tests whether more data is in the resource file that is being written to the cache. If there is more data, the flow loops back to read data operation 514 and this loop 514, 516, 518 continues until all the data of the resource file is read to the writer. As will be discussed hereinafter, while the data is being read to the writer the writer is writing the data and verifying the data in the cache. After all of the data from the resource file is read, then the operation flow returns to the flow in FIG. 3.

The above operation flow is the simplest and most direct flow through the reader module illustrated in FIG. 5. However, if the resource was not found, would not open, or the user did not have access to the resource in the source specified by the user, then the operation flow branches NO from access test operation 512 or NO from resource open test operation 510 to more sources test operation 520. If there are more sources identified by the download package for the resource, then pick operation 522 picks another source for the resource. The sources will be prioritized in the download package and the pick operation 522 will accordingly pick the next possible source on the priority list. The operation flow then proceeds to open resource operation 508 and attempts to open the resource in this new source.

If all the sources have been tried and either the resource was not found, could not be opened, or the user had no access, then more sources test 520 will fail and the operation flow will branch NO from the more sources test 520 to the send operation 524, which will send an error message. The error message will indicate the cause of the problem, e.g., the resource was not found, the resource would not open, or the user does not have access.

Figure 6:
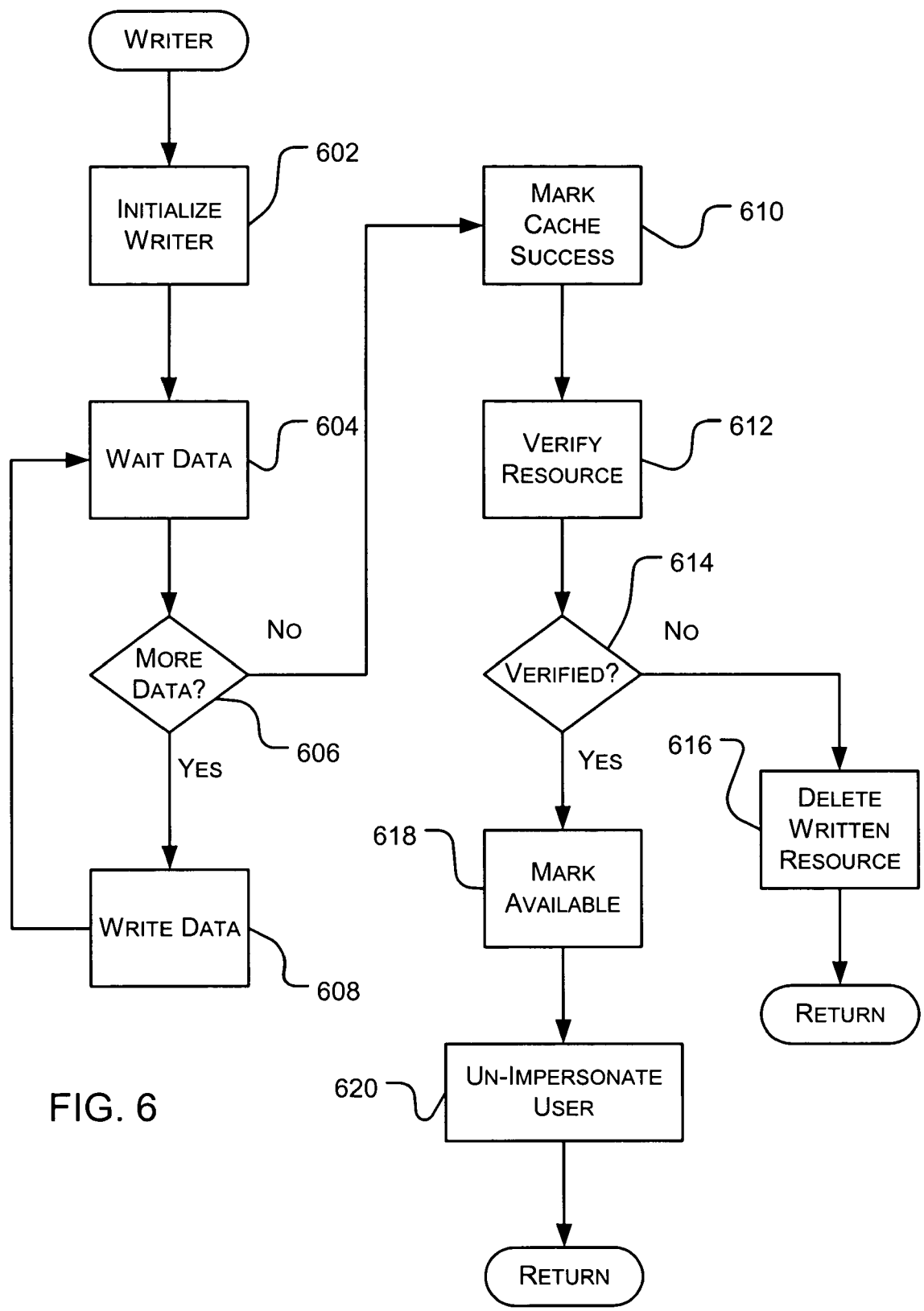
FIG. 6 shows the operational flow of operations performed by the writer module 412 in FIG. 4.

While the reading of data from the resource is occurring, the writer module is operating in parallel to load the data into a cache. FIG. 6 shows the operational flow of the writer module. The write operation begins with initialize operation 602. Initialize operation 602 initializes the writer according to the parameters received with the download package. After initialization the writer at wait operation 604 waits for data from the reader or extractor. When data is received more data test operation 606 detects whether there is more data in the resource information than what has been received at present. If there is more data, then operation flow branches YES to the write data operation 608 that begins to write the data into a cache. Thus, while the reader or extractor is reading information, the writer module is writing the data into the cache when the data is received. This loop of operations 604, 606, and 608 continues until the more data test operation 606 detects that all the data in the resource has been received. When all the data has been received, the operation flow branches NO to the mark operation 610. Mark operation 610 indicates to the user that the caching phase of the operation has been successful. After the resource information is in the cache then a verify operation 612 verifies the resource information. Verify operation 612 operates in a similar manner to the verify operation in FIG. 4. In other words, if a hash count for the resource information matches a hash count downloaded when writing the resource information into the cache, the resource is verified. Verify test operation 614 tests whether the resource information was successfully verified. If it was not, then the operation flow branches NO to delete operation 616. Delete operation 616 deletes the resource information just written into cache and the operation flow returns to the source engine 102 (FIG. 1).

If the verify resource operation is successful, the operation flow branches YES from verify test 614 to mark operation 618. Mark operation 618 marks the resource information as available from the cache. An un-impersonate operation 620 then un-impersonates the user so that the source engine 102 (FIG. 1) will now begin to operate under its computing system profile rather than the user's profile. Operation flow then returns to the get resource information operation 308 in FIG. 3.

Figure 7:
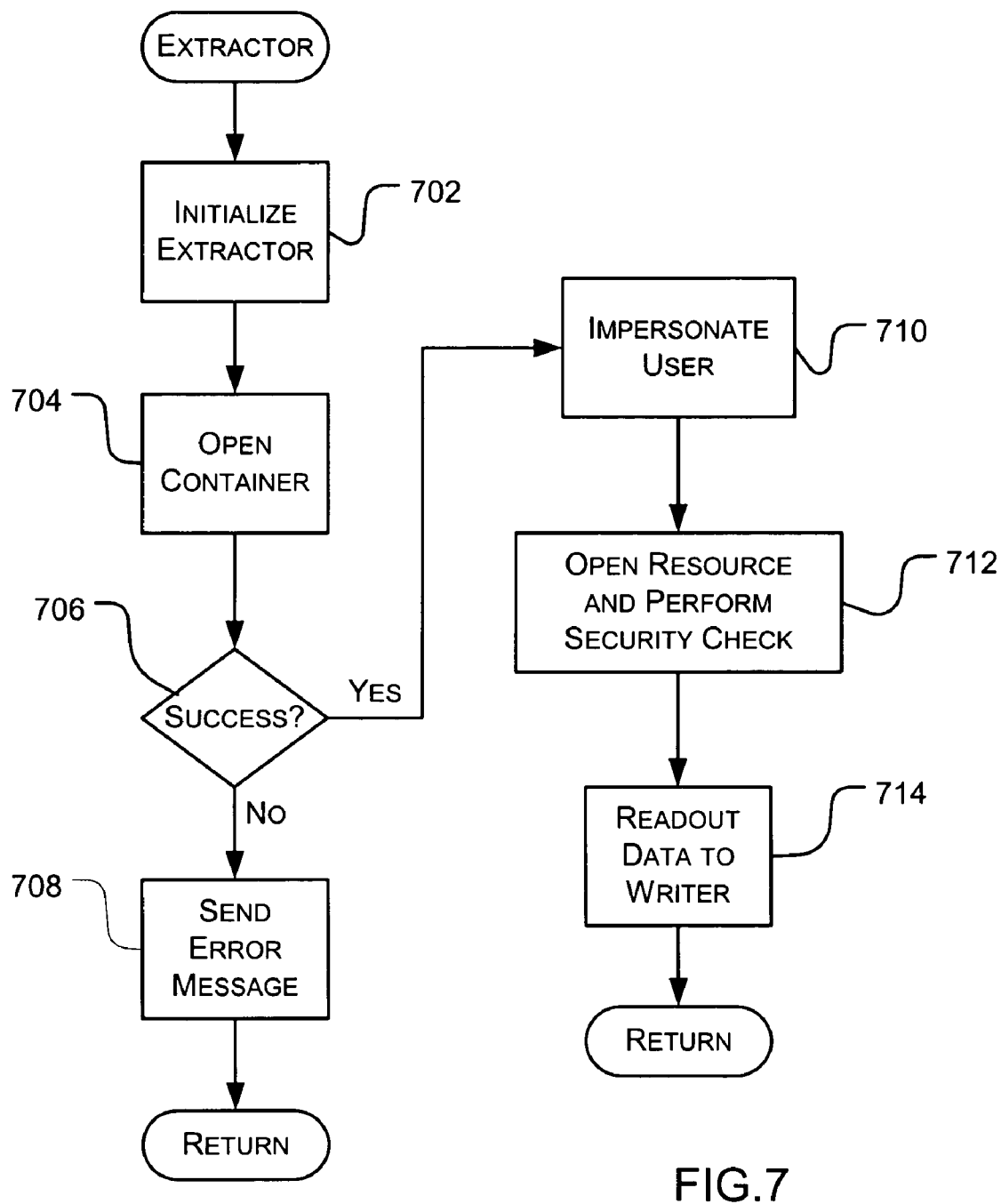
FIG. 7 shows the operational flow of operations performed by the extractor module 416 in FIG. 4.

If the resource information had been retrieved using the extractor module, the same writing module operation flow occurs. In contrast, the reading of the resource information proceeds as indicated in FIG. 7. FIG. 7 shows the operational flow for the extractor module 416 (FIG. 4). The operation flow begins at initialize operation 702 that initializes the extractor according to the parameters received with the download package. Open operation 704 then opens the container in the source that contains the resource file. If the opening of the container is not successful as detected by test operation 706, the operation flow will branch NO and sends an error message operation 708 to the user. An alternative source may then be tried if possible. If the container is opened successfully, then the operation flow branches YES from test operation 706 to impersonate operation 710.

Impersonate operation 710 impersonates the user in a similar manner as impersonate operation 504 does in the reader module as shown in conjunction with FIG. 5. In embodiments, the impersonate operation 710 applies the profile of the user to the source engine so that the opening of the resource and the security check will be performed in accordance with the user's profile.

Open resource and security check module 712 operates in a similar manner as with operations discussed above for opening the resource and checking user access described in FIG. 5. If the resource is found, if it opens successfully, and if the user has access, then operation flow will proceed to the read out module 714. Read out module 714 operates in a similar manner to operations 514, 516, and 518. The extractor module operates in parallel with the writer module so that data is retrieved from a source and read into the cache in parallel operations. The extractor module is similar to the reader module with the additional operations necessary to open a container that contains the resource file.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. In a computer system, a method for retrieving a resource of program code from a source of program code and placing the resource in secure cache in the computer system, the computer having a computing system profile, the method comprising:
    installing a user profile into the computer system to operate based on the user profile rather than the computing system profile;
    picking a first source for the resource;
    opening the resource;
    impersonating, by the computer system, the user profile at the first source;
    testing the computer system's access to the resource based on the user profile, wherein the first source tests whether the user, rather than the computing system, has access to the resource;
    if the user has access, reading the resource to the secure cache;
    if the resource is read to the secure cache, writing the resource to the secure cache of the computer system; and
    if the user does not have access, picking a second resource.

2. The method of claim 1 further comprising:
    verifying the resource written in secure cache is same as resource in source.

3. The method of claim 1 further comprising:
    opening the resource in the second source; and
    reading the resource to the secure cache if the user has access to the resource in the second source.

4. The method of claim 3 further comprising:
    writing the resource into the secure cache; and
    verifying the resource written in secure cache is same as resource in source.

5. The method of claim 4 further comprising:
    un-impersonating the user profile to return the computing system to the system profile.

6. A source engine system, in a computing system having a computing system profile, for retrieving a program code resource from one of a plurality of sources of program code for a user with a user profile, the source engine system comprising:
    an open resource module for opening a program code resource in a source if the user has access;
    a pick source module picking a second source for the resource program code if the user does not have access;
    a read data module providing the program code resource to a writer module;
    the writer module writing the program code resource into the secure cache of the computing system; and
    wherein the source engine system loads the user profile to impersonate the user profile rather than the computing system profile during retrieval of the program code resource and returns to the computing system profile after the program code resource is written to a secure cache.

7. The system of claim 6 further comprising:
    an extractor module extracting a program code resource contained within another program code resource.

8. The system of claim 7 further comprising:
    a verify module verifying the program code resource in the secure cache matches the program code resource in the source; and
    a delete module deleting the program code resource from secure cache if the program code resource in the secure cache does not match the program code resource in the source.

9. The system of claim 8 further comprising:
    a mark module marking the program code resource available to the computing system if the program code resource is verified by the verify module.

10. A computer storage medium for storing a computer process having computer-executable instructions executing a method for caching a resource in a secure cache in a computing system having a computing system profile, the method comprising:

loading a user profile into the computing system;

replacing the computing system profile with the user profile;

determining if a user has access to a resource according to the user profile;

reading the resource from a source of program code if the user profile indicates the user has access;

writing the resource into a secure cache when the resource is read from the source of program code; and removing the user profile and returning to the system profile after writing the resource into cache.

11. The computer readable medium of claim 10 wherein the computer process further comprises:

detecting whether or not the resource is in the secure cache;

verifying the resource if the resource is in the secure cache; and deleting the resource from secure cache if the resource is not verified.

12. The computer readable medium of claim 11 wherein the computer process further comprises:

testing whether the resource is contained in a second resource if the resource is not in the secure cache; and extracting the resource from the second resource if the resource is contained in the second resource.

13. The computer readable medium of claim 10 wherein the act of reading comprises:

opening the resource in a first source if the user has access to the resource in the first source;

picking a second source for the resource if the user does not have access to the resource in the first source; and opening the resource in the second source.

14. The computer readable medium of claim 10, wherein the act of writing a resource further comprises:

verifying the resource written into the secure cache matches the resource in the source.

15. The computer readable medium of claim 14, wherein the act of writing a resource further comprises:

deleting the resource written into the secure cache if the resource does not match the resource in the source.

16. The computer readable medium of claim 14, wherein the act of writing a resource writes the resource into the secure cache while the resource is being read from the source.

* * * * *